United States Patent
Chen et al.

(10) Patent No.: US 8,836,309 B2
(45) Date of Patent: Sep. 16, 2014

(54) CONTROL DEVICE FOR BUCK-BOOST CONVERTER

(75) Inventors: Wen-Wei Chen, New Taipei (TW); Kuo-Chi Liu, Hsinchu (TW)

(73) Assignee: Richtek Technology Corporation, Zhubei (TW)

( * ) Notice: Subject to any disclaimer, the term of this patent is extended or adjusted under 35 U.S.C. 154(b) by 216 days.

(21) Appl. No.: 13/439,240

(22) Filed: Apr. 4, 2012

(65) Prior Publication Data

US 2012/0262142 A1 Oct. 18, 2012

(30) Foreign Application Priority Data

Apr. 15, 2011 (TW) .............................. 100113296 A (51) Int. Cl.
*G05F 1/00* (2006.01)
*H02M 3/158* (2006.01)
*G05F 1/24* (2006.01)

(52) U.S. Cl.
CPC ................................. *H02M 3/1582* (2013.01)
USPC ............................ 323/284; 323/259; 323/283

(58) Field of Classification Search
USPC .......................................... 323/259, 282–284
See application file for complete search history.

(56) References Cited

U.S. PATENT DOCUMENTS

| | | | |
|---|---|---|---|
| 6,166,527 A | 12/2000 | Dwelley et al. | |
| 7,265,524 B2 * | 9/2007 | Jordan et al. | 323/225 |
| 7,394,231 B2 | 7/2008 | Flatness et al. | |
| 7,466,112 B2 | 12/2008 | Zhou et al. | |
| 7,977,928 B2 * | 7/2011 | Fahrenbruch et al. | 323/271 |
| 8,593,122 B2 * | 11/2013 | Chen et al. | 323/284 |
| 2006/0284606 A1 * | 12/2006 | Chen et al. | 323/259 |
| 2009/0108823 A1 * | 4/2009 | Ho et al. | 323/282 |
| 2011/0074373 A1 | 3/2011 | Lin | |

* cited by examiner

*Primary Examiner* — Adolf Berhane
*Assistant Examiner* — Henry Lee, III
(74) *Attorney, Agent, or Firm* — Birch, Stewart, Kolasch & Birch, LLP (57) ABSTRACT

A control device is disclosed, having a signal generating circuit and a mode decision circuit. The signal generating circuit is used to generate a first control signal and a second control signal according to an output voltage of a buck-boost converter. The first control signal is used to conduct a first switch and a second switch of the buck-boost converter. The second control signal is used to conduct a third switch and a fourth switch of the buck-boost converter. When the duty cycle of the first control signal is greater than a first predetermined value and the duty cycle of the second control signal is less than a second predetermined value, the mode decision circuit configures the signal generating circuit to generate the first control signal and the second control signal with substantially the same duty cycle.

22 Claims, 8 Drawing Sheets

CONTROL DEVICE FOR BUCK-BOOST CONVERTER

CROSS-REFERENCE TO RELATED APPLICATIONS

This application claims the benefit of priority to Taiwanese Patent Application No. 100113296, filed on Apr. 15, 2011, the entirety of which is incorporated herein by reference for all purposes.

BACKGROUND

The present disclosure generally relates to a control device and, more particularly, to the control device for a buck-boost converter.

A buck-boost converter may operate in three operation modes, i.e., the boost mode, the buck mode, and the buck-boost mode. The three operation modes may provide the output voltages, which are less than, greater than, and substantially equal to the input voltage, respectively.

The buck-boost converter generates an output voltage, which is greater than the input voltage, when operating in the boost mode. The buck-boost converter generates an output voltage, which is less than the input voltage, when operating in the buck mode. The buck-boost converter may generate an output voltage, which is less than, greater than, or substantially equal to the input voltage, when operating in the buck-boost mode.

When the buck-boost converter switches from one mode to another, ripples may occur at the output of the buck-boost converter. The ripples may cause the performance degradation or even the malfunction of the device supplied by the buck-boost converter

SUMMARY

In view of the foregoing, it is appreciated that a substantial need exists for methods and apparatuses that can reduce the ripples at the output of the buck-boost converter.

An embodiment of a control device is disclosed, comprising: a signal generating circuit, for generating a first, a second, a third, and a fourth control signals according to an output voltage of a buck-boost converter for configuring a first, a second, a third, and a fourth switches of the buck-boost converter; and a mode decision circuit, for configuring the signal generating circuit to generate the first control signal and the third control signal with substantially the same duty cycle and to generate the second control signal and the fourth control signal with substantially the same duty cycle when the duty cycle of the first control signal is greater than a first predetermined value and the duty cycle of the third control signal is less than a second predetermined value; wherein the first control signal and the second control signal do not conduct the first switch and the second switch at the same time, and the third control signal and the fourth control signal do not conduct the third switch and the fourth switch at the same time.

Another embodiment of a control device is disclosed, comprising: a first comparator circuit, for generating a first control signal and a second control signal for respectively configuring a first switch and a second switch of a buck-boost converter according to a first periodical signal and according to a first feedback signal generated from an output voltage of the buck-boost converter; a second comparator circuit, for generating a third control signal and a fourth control signal for respectively configuring a third switch and a fourth switch of the buck-boost converter according to a second periodical signal and according to a second feedback signal generated from the output voltage of the buck-boost converter; and a third comparator circuit, for generating a fifth control signal, a sixth control signal, a seventh control signal, and an eighth control signal for respectively configuring the first switch, the second switch, the third switch, and the fourth switch of the buck-boost converter according to a third periodical signal and according to a third feedback signal generated from the output voltage of the buck-boost converter; wherein the first control signal and the second control signal do not conduct the first switch and the second switch at the same time; the third control signal and the fourth control signal do not conduct the third switch and the fourth switch at the same time; the duty cycle of the fifth control signal and the duty cycle of the seventh control signal are substantially the same; the duty cycle of the sixth control signal and the duty cycle of the eighth control signal are substantially the same; the fifth control signal and the sixth control signal do not conduct the first switch and the second switch at the same time; and the seventh control signal and the eighth control signal do not conduct the third switch and the fourth switch at the same time.

Another embodiment of a control device is disclosed, comprising: a signal generating circuit, for generating a first control signal according to an output voltage of a buck-boost converter to configure a first switch and/or a second switch of the buck-boost converter and for generating a second control signal to configure a third switch and/or a fourth switch of the buck-boost converter; and a mode decision circuit, for configuring the signal generating circuit to generate the first control signal and the second control signal with substantially the same duty cycle when the duty cycle of the first control signal is greater than a first predetermined value and the duty cycle of the second control signal is less than a second predetermined value; wherein the first control signal does not conduct the first switch and the second switch at the same time, and the third switch and the fourth switch are not conducted at the same time by the second control signal.

Another embodiment of a control device is disclosed, comprising: a first comparator circuit, for generating a first control signal for configuring a first switch and a second switch of a buck-boost converter according to a first periodical signal and according to a first feedback signal generated from an output voltage of the buck-boost converter; a second comparator circuit, for generating a second control signal for configuring a third switch and a fourth switch of the buck-boost converter according to a second periodical signal and according to a second feedback signal generated from the output voltage of the buck-boost converter; and a third comparator circuit, for generating a third control signal for configuring the first switch and the second switch and for generating a fourth control signal for configuring the third switch and the fourth switch of the buck-boost converter according to a third periodical signal and according to a third feedback signal generated from the output voltage of the buck-boost converter; wherein the first control signal does not conduct the first switch and the second switch at the same time; the second control signal does not conduct the third switch and the fourth switch at the same time; the third control signal does not conduct the first switch and the second switch at the same time; and the fourth control signal does not conduct the third switch and the fourth switch at the same time.

It is to be understood that both the foregoing general description and the following detailed description are exemplary and explanatory only and are not restrictive of the invention, as claimed.

DETAILED DESCRIPTION

Reference will now be made in detail to embodiments of the invention, which are illustrated in the accompanying drawings. The same reference numbers may be used throughout the drawings to refer to the same or like parts or components/operations. Certain terms are used throughout the description and following claims to refer to particular components. As one skilled in the art will appreciate, vendors may refer to a component by different names. This document does not intend to distinguish between components that differ in name but not in function. In the following description and in the claims, the terms "comprise" are used in an open-ended fashion, and thus should be interpreted to mean "include, but not limited to . . . ." The phrase "coupled with" is intended to compass any indirect or direct connection. Accordingly, if this document mentioned that a first device is coupled with a second device, it means that the first device may be directly or indirectly connected to the second device through an electrical connection, wireless communications, optical communications, or other signal connections with/without other intermediate devices or connection means.

In the description and drawings, the numbers, the locations, and the connections of the components are illustrative only. Other circuits, components, and connections may be omitted in the drawings. People of ordinary skill in the art may appreciate that each component may be realized with one or more component(s) and the function of the multiple components may be realized by a single component. People of ordinary skill in the art may appreciate that signals, devices, circuits, or operations in the description or drawings may be, respectively or collective, characterized in the voltage form or in the current form without departing from the spirit of the invention.

Figure 1:
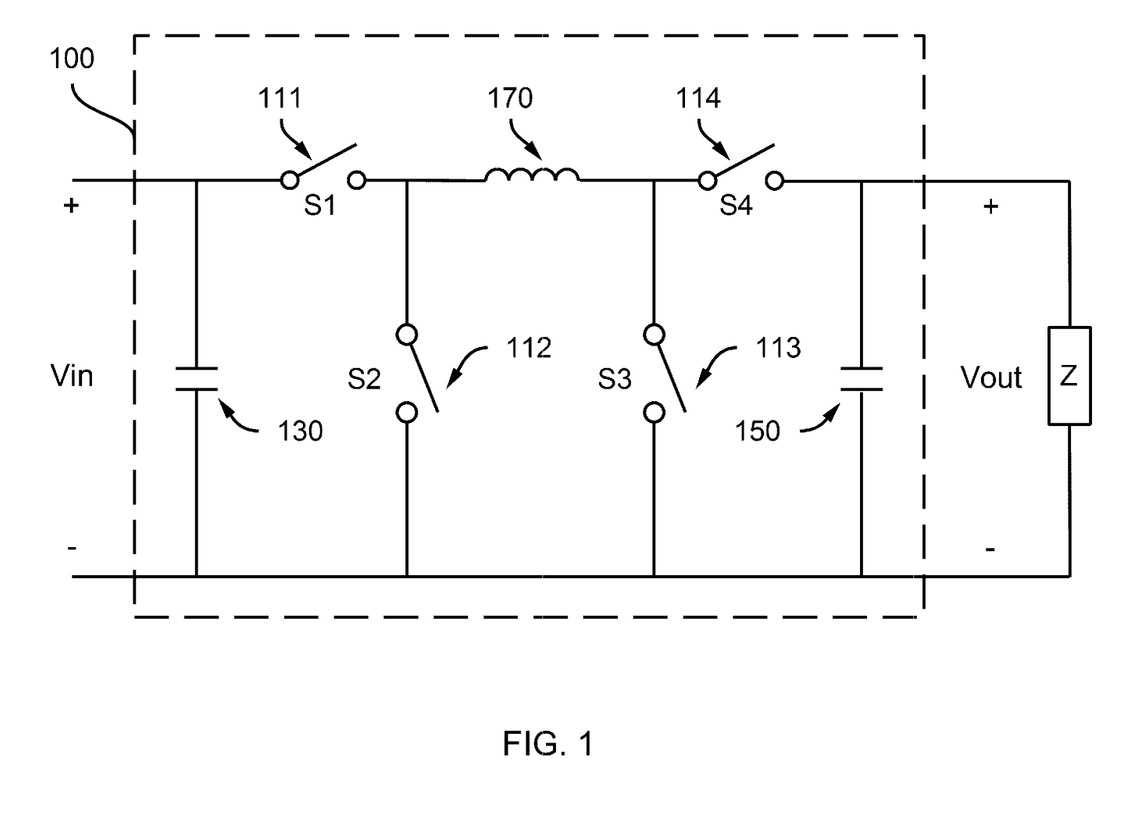
FIG. 1 shows a simplified block diagram of an example buck-boost converter.

FIG. 1 shows a simplified block diagram of an example buck-boost converter 100. The buck-boost converter 100 comprises switches 111, 112, 113, and 114, capacitors 130 and 150, and an inductor 170. The buck-boost converter 100 may convert an input voltage Vin to an output voltage Vout, and provides the output voltage Vout to a load Z.

The switches 111, 112, 113, and 114 may be realized with any suitable types of diodes, transistors, active devices, passive devices, and/or mechanical switches. The switches 111, 112, 113, and 114 may be conducted or not conducted according to the control signals S1, S2, S3, and S4, respectively. The statuses of being conducted and being not conducted may be comparative, and do not have to be strictly confined by the conducting current, the impedance, or other requirement(s). For example, in one embodiment, the switches are realized with transistors. Compared with the switch in the conducted status, the switch in the not-conducted status conducts a smaller current and possesses greater impedance.

In this disclosure, the control signals S1, S2, S3, and S4 are represented as active high signals. That is, the switch is conducted when the voltage of the control signal is greater than a predetermined value (referred as "the control signal is high" hereinafter for conciseness), and the switch is not conducted when the voltage of the control signal is less than the predetermined value (referred as "the control signal is low" hereinafter for conciseness). Other signals are also expressed as active high signals in this disclosure for concise explanation. In other embodiments, the signals may be respectively represented as active high signals, and/or active low signals with suitable modification to the relevant circuits.

As shown in FIG. 1, the capacitor 130 is coupled with the input voltage Vin. The switch 111 is coupled between the capacitor 130 and the inductor 170. The switch 112 is coupled between the switch 111 and the capacitor 130. The switch 113 is coupled between the inductor 170 and the switch 112. The switch 114 is coupled between the inductor 170 and the capacitor 150. The inductor 170 is coupled between the switch 111 and the switch 114. The capacitor 150 is coupled between the switch 113 and the switch 114. The load Z is coupled with the two ends of the capacitor 150 for receiving the output voltage Vout.

When the control signal S1 is high and the control signal S2 is low, the switch 111 is conducted and the switch 112 is not conducted. In this configuration, the switches 113 and 114 are conducted or not conducted according to the control signals S3 and S4, respectively. Thus, the buck-boost converter 100 operates in the boost mode for generating the output voltage Vout, which is greater than the input voltage Vin.

When the control signal S3 is low and the control signal S4 is high, the switch 113 is not conducted and the switch 114 is conducted. In this configuration, the switches 111 and 112 are conducted or not conducted according to the control signals S1 and S2, respectively. Thus, the buck-boost converter 100 operates in the buck mode for generating the output voltage Vout, which is less than the input voltage Vin.

Figure 2:
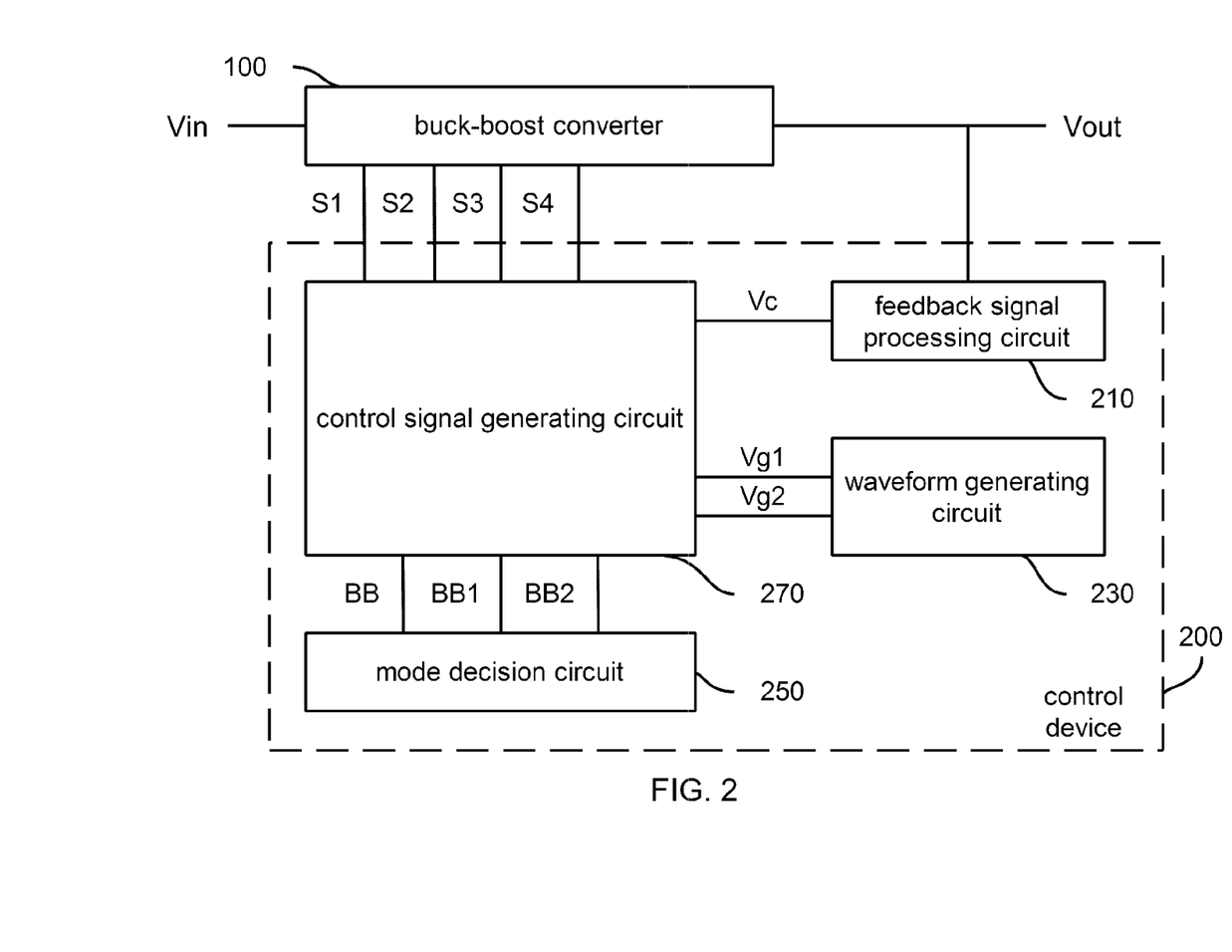
FIG. 2 shows a simplified block diagram of an example control device for the buck-boost converter in FIG. 1.

When the switches 111, 112, 113, and 114 are conducted or not conducted according to the control signals S1, S2, S3, and S4, respectively, the buck-boost converter 100 operates in the buck-boost mode for generating the output voltage Vout, which may be less than, greater than, or substantially equal to the input voltage Vin FIG. 2 shows a simplified block of an example control device 200 for the buck-boost converter 100. The operation of the control device 200 is further explained below with FIGS. 1 and 2. The control device 200 receives the output voltage Vout of the buck-boost converter 100 and provides the control signals S1, S2, S3, and S4 to the buck-boost converter 100 for conducting or not conducting the switches 111, 112, 113, and 114, respectively.

The control device 200 comprises a feedback signal processing circuit 210, a waveform generating circuit 230, a mode decision circuit 250, and a control signal generating circuit 270.

The feedback signal processing circuit 210 receives the output voltage Vout of the buck-boost converter 100 for generating a reference signal Vc. The waveform generating circuit 230 generates reference signals Vg1 and Vg2. The mode decision circuit 250 provides control signals BB, BB1, and BB2 to the control signal generating circuit 270 for configuring the operation of the buck-boost converter 100, i.e., operating in the buck mode, the boost mode, or the buck-boost mode. The control signal generating circuit 270 provides the control signals S1, S2, S3, and S4 according to the reference signals Vc, Vg1, and Vg2 and the control signals BB, BB1, and BB2 for conducting or not conducting the switches 111, 112, 113, and/or 114 of the buck-boost convert 100.

In this embodiment, the output voltage Vout of the buck-boost converter 100 is transmitted to the feedback signal processing circuit 210. The feedback signal processing circuit 210 generates the reference signal Vc according to the output voltage Vout of the buck-boost converter 100. For example, the feedback signal processing circuit 210 may generate the reference signal Vc=A×Vout+B, wherein the parameters A and B may be respectively configured as zero, positive value, or negative value.

In another embodiment, the feedback signal circuit 210 generates one or more reference signal(s) according to the output voltage Vout and a current signal I (not shown in the figures) of the buck-boost converter 100. The current signal I may be the current flowing through the inductor 170, the current flowing through the switches 111, 112, 113, and/or 114, or the combination of the currents flowing through the components in the buck-boost converter 100. For example, the feedback signal processing circuit 210 may generate the signal Vc=Σ(An×Vout$^n$+Bn×I$^n$)+C, wherein the parameters n, An, Bn, and C may be respectively configured as zero, positive value, or negative value.

In another embodiment, the output voltage Vout of the buck-boost converter 100 may be processed by another signal processing circuit inside and/or outside of the control device 200 (not shown in the figures) before transmitted to the feedback signal processing circuit 210 for generating the reference signal Vc.

Figure 3:
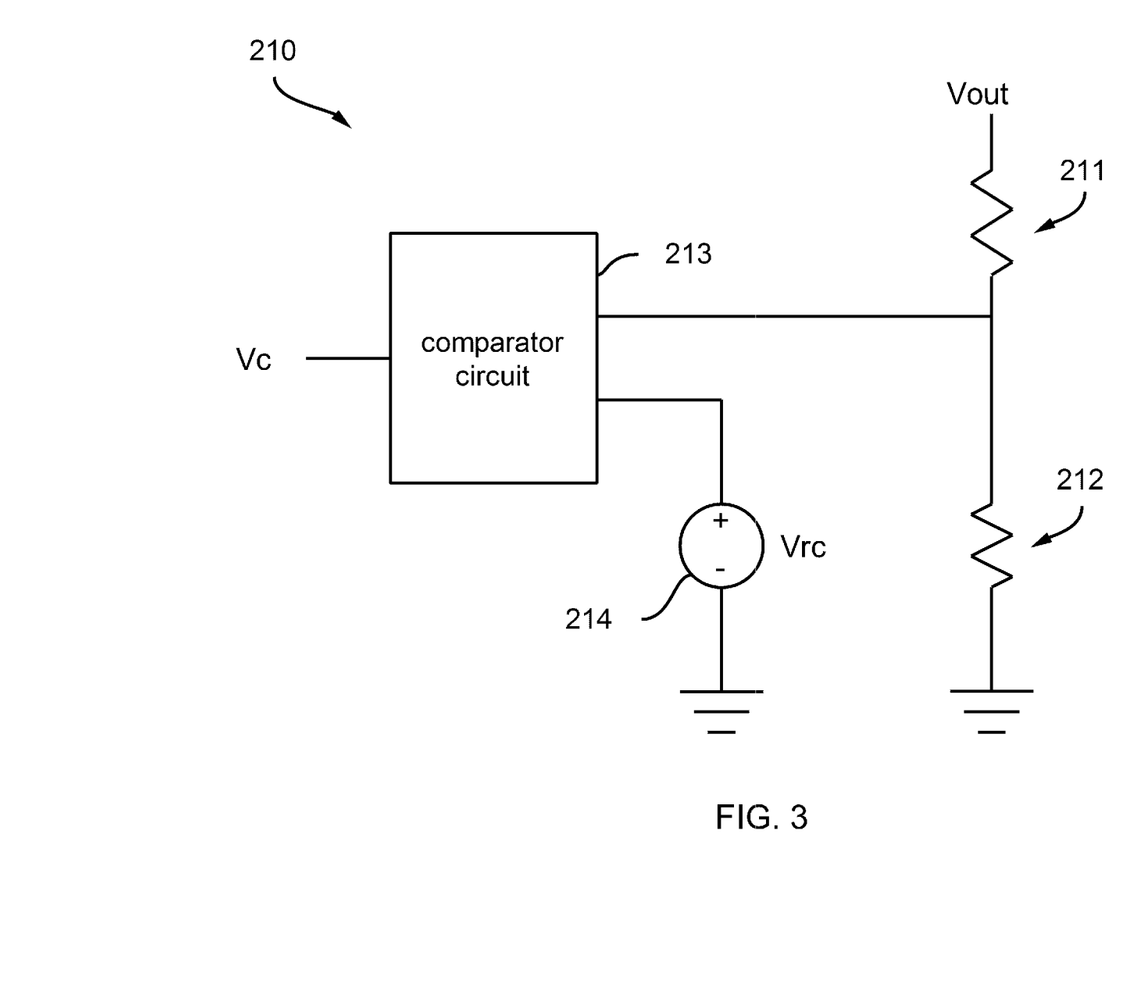
FIG. 3 shows a simplified block diagram of the feedback signal processing circuit in FIG. 2.

FIG. 3 shows a simplified block diagram of an example feedback signal processing circuit 210. In the embodiment in FIG. 3, the feedback signal processing circuit 210 comprises resistors 211 and 212, a comparator circuit 213, and a reference voltage source 214. The resistors 211 and 212, the comparator circuit 213, and the reference voltage source 214 may be realized with suitable active device(s) and/or passive device(s). The reference voltage source 214 may also be directly coupled with a predetermined voltage level. For example, the comparator circuit 213 may be realized with the differential amplifier(s) and the resistors 211 and 212 may be realized with transistors.

The resistors 211 and 212 are coupled between the output voltage Vout and the ground for providing a scaled signal of the output voltage Vout to one input end of the comparator circuit 213. The reference voltage source 214 provides a voltage Vrc for coupling with the other input end of the comparator circuit 213. In this embodiment, the resistors 211 and 212 and the comparator circuit 213 may be configured so that the output end of the comparator circuit 213 may generate the reference signal Vc=D×(Vrc−E×Vout), wherein the parameters D and E may be configured as zero, positive value, or negative value.

In this embodiment, one end of the resistor 212 and one end of the reference voltage source 214 are coupled with the ground. In another embodiment, one end of the resistor 212 and one end of the voltage source 214 may be respectively coupled with the same voltage level or different voltage levels. In another embodiment, a predetermined voltage level (e.g., the ground) may be transmitted to an input end of the comparator circuit 213. Moreover, the output voltage Vout is coupled with the voltage source 214 through the resistors 211 and 212, and the signal between the resistors 211 and 212 is transmitted to the other input end of the comparator circuit 213 for generating the reference signal Vc.

The waveform generating circuit 230 may be realized with suitable active device(s) and/or passive device(s) to generate one or more periodical reference signals according to oscillating signals of an oscillator or clock signals. The periodical reference signals may be triangular waves, sawtooth waves, sinusoidal waves, or other suitable periodical signals with suitable amplitude. The period, the voltage level, the peak-to-peak voltage, and/or the waveform of the periodical reference signal may be configured to be fixed or adjustable. In another embodiment, at least one of the periods, the voltage levels, the peak-to peak voltages, and the waveforms of the reference signal Vg1 and Vg2 generated by the waveform generating circuit 230 are configured to be different. In other embodiments, the waveform generating circuit 230 may generate several periodical reference signals, each of which may be configured to have the same or different periods, voltage levels, peak-to-peak voltages, and/or waveforms.

The mode decision circuit 250 is used to provide the control signals BB, BB1, and BB2 to the control signal generating circuit 270 for configuring the operation mode of the buck-boost converter 100. The control signal generating circuit 270 is configured by the control signals BB, BB1, and/or BB2 to provide the control signals S1, S2, S3, and S4 for operating the buck-boost converter 100 in the buck mode, the boost mode, or the buck-boost mode.

In one embodiment, the mode decision circuit 250 generates the control signal BB according to the input voltage Vin and the output voltage Vout of the buck-boost converter 100. For example, when (Vout−Vin)<Vrbb1 or (Vin−Vout)<Vrbb2, the mode decision circuit 250 generates the control signal BB for configuring the control signal generating circuit 270 to provide the control signals S1, S2, S3, and S4 for operating the buck-boost converter 100 in the buck-boost mode. The reference voltages Vrbb1 and Vrbb2 may be configured as the same value or different values.

For example, when Vrbb1 and Vrbb2 are both configured as 0.1 volt and the difference between the input voltage Vin and the output voltage Vout is less than 0.1 volt, the mode decision circuit 250 generates the control signal BB for configuring the buck-boost converter 100 to operate in the buck-boost mode, e.g., the control signal BB is configured to be high. Therefore, the control signal generating circuit 270 is configured by the control signal BB to provide the control signals S1, S2, S3, and S4 for operating the buck-boost converter 100 in the buck-boost mode.

In another embodiment, the mode decision circuit 250 generates the control signals BB1 and/or BB2 according to the duty cycles of the control signals S1, S2, S3, and/or S4. The duty cycle is the percentage of time in one period of the control signal, in which the control signal configures the switch to be conducted. Thus, the value of the duty cycle is less than or equal to 1, and greater than or equal to 0.

For example, when the buck-boost converter 100 operates in the boost mode, the switch 111 is conducted and the switch 112 is not conducted. The control signal S1 is high and the control signal S2 is low, i.e., the duty cycle of the control signal S1 is equal to 1 and the duty cycle of the control signal S2 is equal to 0. When the duty cycle of the control signal S3 is less than a predetermined value Ds3bt, the mode decision circuit 250 generates the control signal BB1 for configuring the buck-boost converter 100 to operate in the buck-boost mode, e.g., the control signal BB1 is configured to be high. Therefore, the control signal generating circuit 270 is configured by the control signal BB1 to provide the control signals S1, S2, S3, and S4 for operating the buck-boost converter 100 in the buck-boost mode.

In another embodiment, when the buck-boost converter 100 operates in the boost mode, the duty cycle of the control signal S1 may be configured to be less than but close to 1 according to some practical design considerations. For example, the duty cycle of the control signal S1 may be configured to be greater than or equal to 0.99.

For example, in one embodiment, the buck-boost converter 100 operates in the boost mode. When the duty cycle of the control signal S1 is greater than or equal to 0.99 and the duty cycle of the control signal S3 is less than the predetermined value Ds3$bt$=0.05, the control signal BB1 is configured to be high for configuring the buck-boost converter 100 to operate in the buck-boost mode. Therefore, the control signal generating circuit 270 is configured by the control signal BB1 to provide the control signals S1, S2, S3, and S4 for operating the buck-boost converter 100 in the buck-boost mode.

In another embodiment, when the buck-boost converter 100 operates in the buck mode, the switch 113 is not conducted and the switch 114 is conducted. The control signal S3 is low and the control signal S4 is high, i.e., the duty cycle of the control signal S3 is equal to 0, and the duty cycle of the control signal S4 is equal to 1. When the duty cycle of the control signal S1 is greater than a predetermined value Ds1$bk$, the mode decision circuit 250 generates the control signal BB2 for configuring the buck-boost converter 100 to operate in the buck-boost mode, e.g., the control signal BB2 is configured to be high. Therefore, the control signal generating circuit 270 is configured by the control signal BB2 to provide the control signals S1, S2, S3, and S4 for operating the buck-boost converter 100 in the buck-boost mode.

In another embodiment, when the buck-boost converter 100 operates in the buck mode, the duty cycle of the control signal S3 may be configured to be greater than but close to 0 according to some practical design considerations. For example, the duty cycle of the control signal S3 may be configured to be less than or equal to 0.01.

For example, in one embodiment, the buck-boost converter 100 operates in the buck mode. When the duty cycle of the control signal S3 is less than or equal to 0.01 and the duty cycle of the control signal S1 is greater than the predetermined value Ds1$bk$=0.95, the control signal BB2 is configured to be high for configuring the buck-boost converter 100 to operate in the buck-boost mode. Therefore, the control signal generating circuit 270 is configured by the control signal BB2 to provide the control signals S1, S2, S3, and S4 for operating the buck-boost converter 100 in the buck-boost mode.

In another embodiment, the buck-boost converter 100 operates in the buck-boost mode. When the duty cycle of the control signal S1 is less than a predetermined value Ds1$bb1$ and the duty cycle of the control signal S3 is less than a predetermined value Ds3$bb1$, the mode decision circuit 250 generates the control signal BB1 for configuring the buck-boost converter 100 to operate in the buck mode, e.g., the control signal BB1 is configured to be low. Therefore, the control signal generating circuit 270 is configured by the control signal BB1 to provide the control signals S1, S2, S3, and S4 for operating the buck-boost converter 100 in the buck mode. The predetermined values Ds1$bb1$ and Ds3$bb1$ may be configured to be the same or different.

For example, in one embodiment, the buck-boost converter 100 operates in the buck-boost mode. When the duty cycle of the control signal S1 is less than Ds1$bb1$=0.47 and the duty cycle of the control signal S3 is less than the predetermined value Ds3$bb1$=0.47, the control signal BB1 is configured to be low for configuring the buck-boost converter 100 to operate in the buck mode. Therefore, the control signal generating circuit 270 is configured by the control signal BB1 to provide the control signals S1, S2, S3, and S4 for operating the buck-boost converter 100 in the buck mode.

In another embodiment, the buck-boost converter 100 operates in the buck-boost mode. When the duty cycle of the control signal S1 is greater than a predetermined value Ds1$bb2$ and the duty cycle of the control signal S3 is greater than a predetermined value Ds3$bb2$, the mode decision circuit 250 generates the control signal BB2 for configuring the buck-boost converter 100 to operate in the boost mode, e.g., the control signal BB2 is configured to be low. Therefore, the control signal generating circuit 270 is configured by the control signal BB2 to provide the control signals S1, S2, S3, and S4 for operating the buck-boost converter 100 in the boost mode. The predetermined values Ds1$bb2$ and Ds3$bb2$ may be configured to be the same or different.

For example, in one embodiment, the buck-boost converter 100 operates in the buck-boost mode. When the duty cycle of the control signal S1 is greater than Ds1$bb2$=0.53 and the duty cycle of the control signal S3 is greater than the predetermined value Ds3$bb2$=0.53, the control signal BB2 is configured to be low for configuring the buck-boost converter 100 to operate in the boost mode. Therefore, the control signal generating circuit 270 is configured to provide the control signals S1, S2, S3, and S4 for operating the buck-boost converter 100 in the boost mode.

In another embodiment, the mode decision circuit 250 may generate the control signals BB, BB1, and BB2, and/or other control signal(s) for configuring the control signal generating circuit 270 to provide the control signals S1, S2, S3, and S4 for operating the buck-boost converter 100 in the buck mode, in the boost mode, or in the buck-boost mode.

Figure 4:
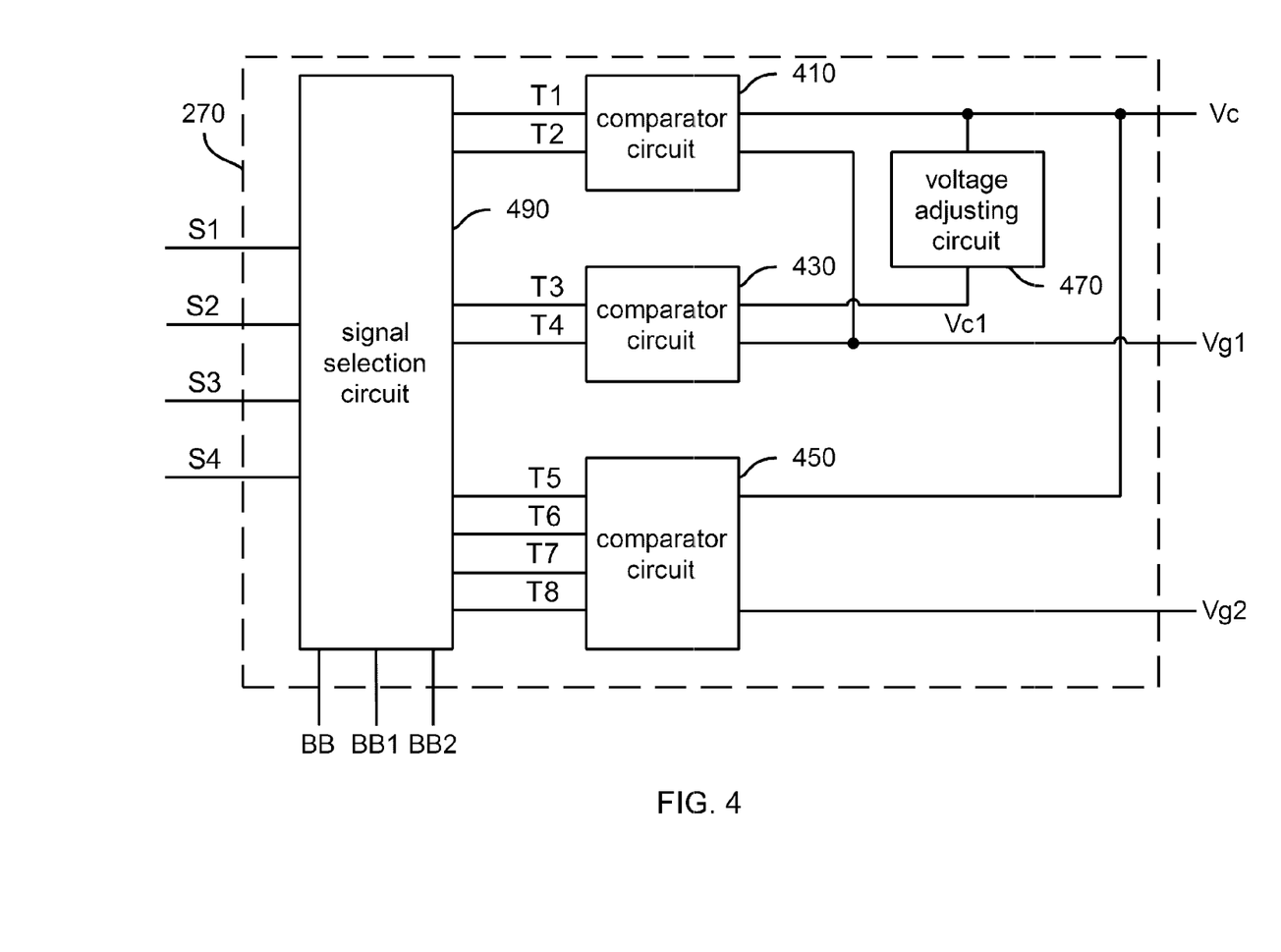
FIG. 4 shows a simplified block diagram of the control signal generating circuit in FIG. 2.

In this embodiment, when the control signals BB, BB1, and/or BB2 are high, the control signal generating circuit 270 provides the control signals S1, S2, S3, and S4 for operating the buck-boost converter 100 in the buck-boost mode. In another embodiment, the control signals BB, BB1, and/or BB2 may be respectively configured to be high or low so that the control signal generating circuit 270 may provide the control signals S1, S2, S3, and S4 for operating the buck-boost converter 100 in the boost mode, in the buck mode, or in the buck-boost mode FIG. 4 shows a simplified block diagram of an example control signal generating circuit 270. The control signal generating circuit 270 comprises comparator circuits 410, 430, and 450, a voltage adjusting circuit 470, and a signal selection circuit 490. The control signal generating circuit 270 provides the control signals S1, S2, S3, and S4 according to the reference signal Vc, Vg1, and Vg2 and according to the control signals BB, BB1, and/or BB2.

The comparator circuit 410 is used for receiving the reference signal Vc generated from the feedback signal processing circuit 210 and the reference signal Vg1 generated from the waveform generating circuit 230. In this embodiment, when the reference signal Vc is greater than the reference signal Vg1, the comparator circuit 410 configures a control signal T1 to be high and a control signal T2 to be low. When the reference signal Vc is less than the reference signal Vg1, the comparator circuit 410 configures the control signal T1 to be low and the control signal T2 to be high.

In another embodiment, when the reference signal Vc is greater than the reference signal Vg1, the comparator circuit 410 configures the control signal T1 to be low and the control signal T2 to be high. When the reference signal Vc is less than the reference signal Vg1, the comparator circuit 410 configures the control signal T1 to be high and the control signal T2 to be low. Moreover, the comparator circuits 430 and 450 may also generate control signals T3~T8 in the same manner. The comparator circuits 410, 430, and 450 may be realized with pulse width modulators, amplifiers, and/or other comparator circuits with actives device(s) and/or passive device(s).

The voltage adjusting circuit 470 receives the reference signal Vc generated from the feedback signal processing 210 and generates a reference signal Vc1=Vc+Vsh. In this embodiment, the signal difference Vsh between the reference signal Vc and the reference signal Vc1 is configured as a negative voltage, and the absolute value of the signal difference Vsh is greater than the peak-to-peak voltage of the reference signal Vg1. In another embodiment, the signal difference Vsh may be configured as a suitable positive value or a suitable negative value. The voltage adjusting circuit 470 may be realized with a voltage source, a current mirror cooperated with active device(s) and/or passive device(s), and/or other suitable circuits cooperated with active device(s) and/or passive device(s) for generating the reference signal Vc1.

The comparator circuit 430 is used to receive the reference signal Vc1 generated from the voltage adjusting circuit 470 and the reference signal Vg1 generated from the waveform generating circuit 230. In this embodiment, when the reference signal Vc1 is greater than the reference signal Vg1, the comparator circuit 430 configures the control signal T3 to be high and the control signal T4 to be low. When the reference signal Vc1 is less than the reference signal Vg1, the comparator circuit 430 configures the control signal T3 to be low and the control signal T4 to be high, The comparator circuit 450 is used to receive the reference signal Vc generated from the feedback signal processing circuit 210 and the reference signal Vg2 generated from the waveform generating circuit 230. In this embodiment, when the reference signal Vc is greater than the reference signal Vg2, the comparator circuit 450 configures the control signal T5 to be high, the control signal T6 to be low, the control signal T7 to be high, and the control signal T8 to be low. When the reference signal Vc is less than the reference signal Vg2, the comparator circuit 450 configures the control signal T5 to be low, the control signal T6 to be high, the control signal T7 to be low, and the control signal T8 to be high. Moreover, the duty cycles of the control signals T5 and T7 are substantially the same, and the duty cycles of the control signals T6 and T8 are substantially the same.

The signal selection circuit 490 selects the control signals T1, T2, T3, and T4 or selects the control signals T5, T6, T7, and T8 to be the control signals S1, S2, S3, and S4, respectively, according to the control signals BB, BB1, and/or BB2. In this embodiment, when the control signals BB, BB1 and/or BB2 configure the buck-boost converter 100 to operate in the boost mode or in the buck mode, the signal selection circuit 490 selects the control signals T1, T2, T3, and T4 to be the control signals S1, S2, S3, and S4, respectively. When the control signals BB, BB1 and/or BB2 configure the buck-boost converter 100 to operate in the buck-boost mode, the signal selection circuit 490 selects the control signals T5, T6, T7, and T8 to be the control signals S1, S2, S3, and S4, respectively. In another embodiment, when the control signals BB, BB1 and/or BB2 configure the buck-boost converter 100 to operate in one of the boost mode, the buck mode, and the buck-boost mode, the signal selection circuit 490 selects the control signals T1, T2, T3, and T4 or selects the control signals T5, T6, T7, and T8 to be the control signals S1, S2, S3, and S4, respectively.

In another embodiment, the signal selection circuit 490 is configured at the outside of the control device 200. The control device 200 transmits the control signals T1~T8 and the control signals BB, BB1 and/or BB2 to the signal selection circuit 490 so that the signal selection circuit 490 may provide the suitable selection of the control signals S1~S4 from the control signals T1~T8 to configure the buck-boost converter 100.

In another embodiment, the mode decision circuit 250 and the signal selection circuit 490 are configured at the outside of the control device 200. The control device 200 transmits the control signals T1~T8 to the signal selection circuit 490 and the mode decision circuit 250 transmits the control signals BB, BB1 and/or BB2 to the signal selection circuit 490. The control signals BB, BB1 and/or BB2 configure the signal selection circuit 490 to select the control signals T1, T2, T3, and T4 or to select the control signals T5, T6, T7, and T8 as the control signals S1, S2, S3, and S4, respectively, for operating the buck-boost converter 100 in the boost mode, the buck mode, or the buck-boost mode.

In the foregoing embodiments, the reference signals Vc, Vc1, Vg1, and Vg2, and/or relevant circuits may be configured so that the duty cycles of the control signals T1~T4 and the duty cycles of the control signals T5~T8 may be configured appropriately. Therefore, the ripple at the output voltage Vout of the buck-boost convert 100 may be reduced when switching between operation modes.

For example, in one embodiment, the buck-boost converter 100 operates in the boost mode. When the duty cycle of the control signal S1 is greater than or equal to 0.99 and the duty cycle of the control signal S3 is less than or equal to the predetermined value Ds3$bt$=0.05, the control signal BB1 is configured to be high. Moreover, when the duty cycle of the control signal S3 is substantially equal to 0.05, the comparator circuit 450 is configured to generate the control signals T5 and T7 with the same duty cycle, 0.513. The control signal generating circuit 270 selects the control signals T5~T8 to be the control signals S1~S4 for operating the buck-boost converter 100 in the buck-boost mode.

In another embodiment, the buck-boost converter 100 operates in the buck mode. When the duty cycle of the control signal S3 is less than or equal to 0.01 and the duty cycle of the control signal S1 is greater than or equal to the predetermined value Ds1$bk$=0.95, the control signal BB2 is configured to be high. Moreover, when the duty cycle of the control signal S1 is substantially equal to 0.95, the comparator circuit 450 is configured to generate the control signals T5 and T7 with the same duty cycle, 0.487. The control signal generating circuit 270 selects the control signals T5~T8 to be the control signals S1~S4 for operating the buck-boost converter 100 in the buck-boost mode.

FIGS. 5~8 show several simplified waveforms of the signals generated by the control signal generating circuit 270. The operation of the control signal generating circuit 270 is further explained below with FIGS. 4~8.

Figure 5:
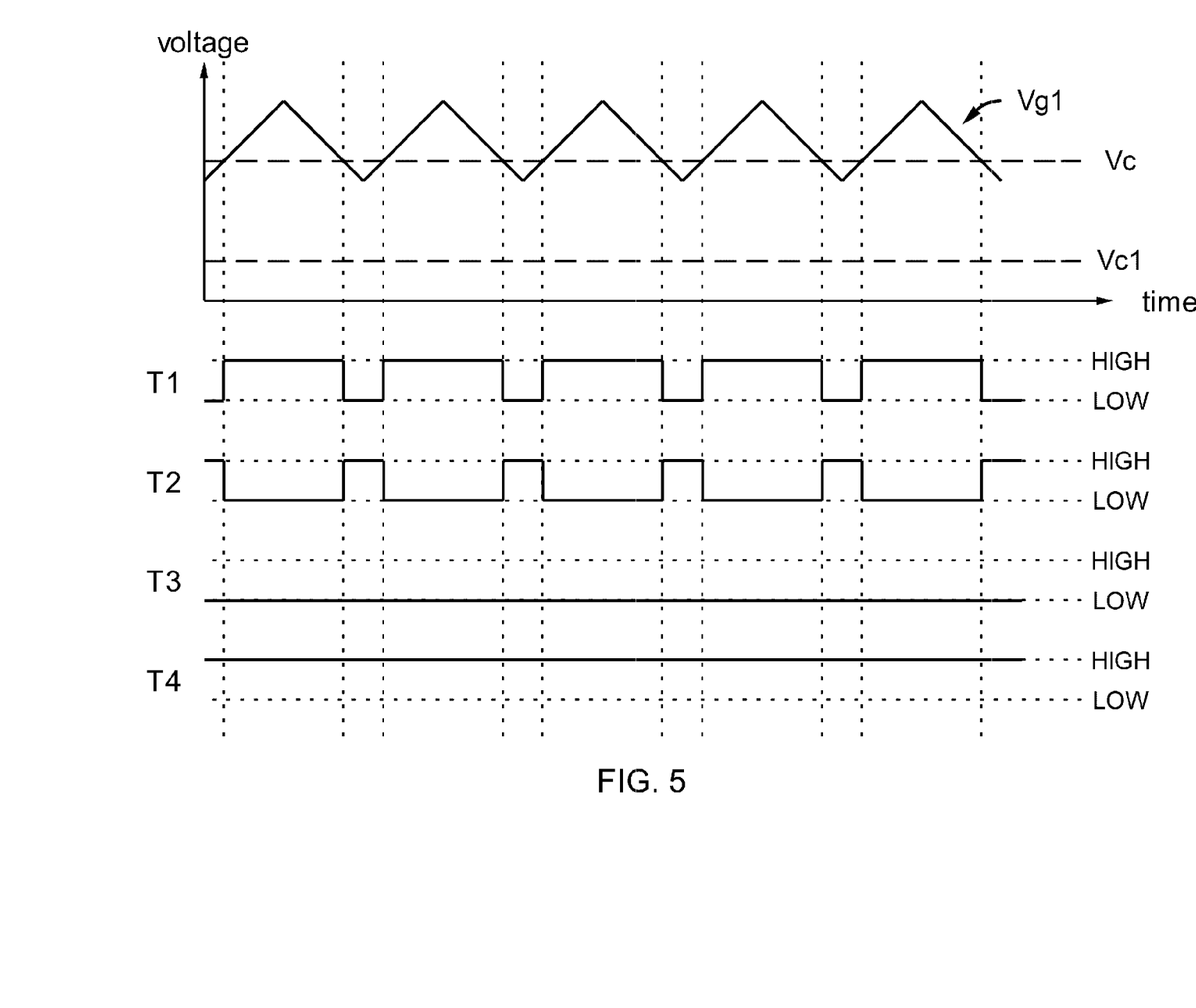
FIGS. 5~8 show several simplified waveforms of the signals generated by the control signal generating circuit in FIG. 2, all arranged in accordance with at least some embodiments of the present disclosure described herein.

In FIG. 5, the reference signal Vc locates between the maximum value and the minimum value of the reference signal Vg1 and the reference signal Vc1 is always less than the reference signal Vg1. Moreover, the control signals BB, BB1, and/or BB2 (not shown in the FIG. 5) do not configure the buck-boost converter 100 to operate in the buck-boost mode. In this configuration, the comparator circuit 410 generates the periodical control signals T1 and T2, and the comparator circuit 430 configures the control signal T3 to be low and the control signal T4 to be high. The signal selection circuit 490 selects the control signals T1, T2, T3, and T4 to be the control signals S1, S2, S3, and S4 according to the control signals BB, BB1, and/or BB2 so that the buck-boost converter 100 operates in the buck mode.

Figure 6:
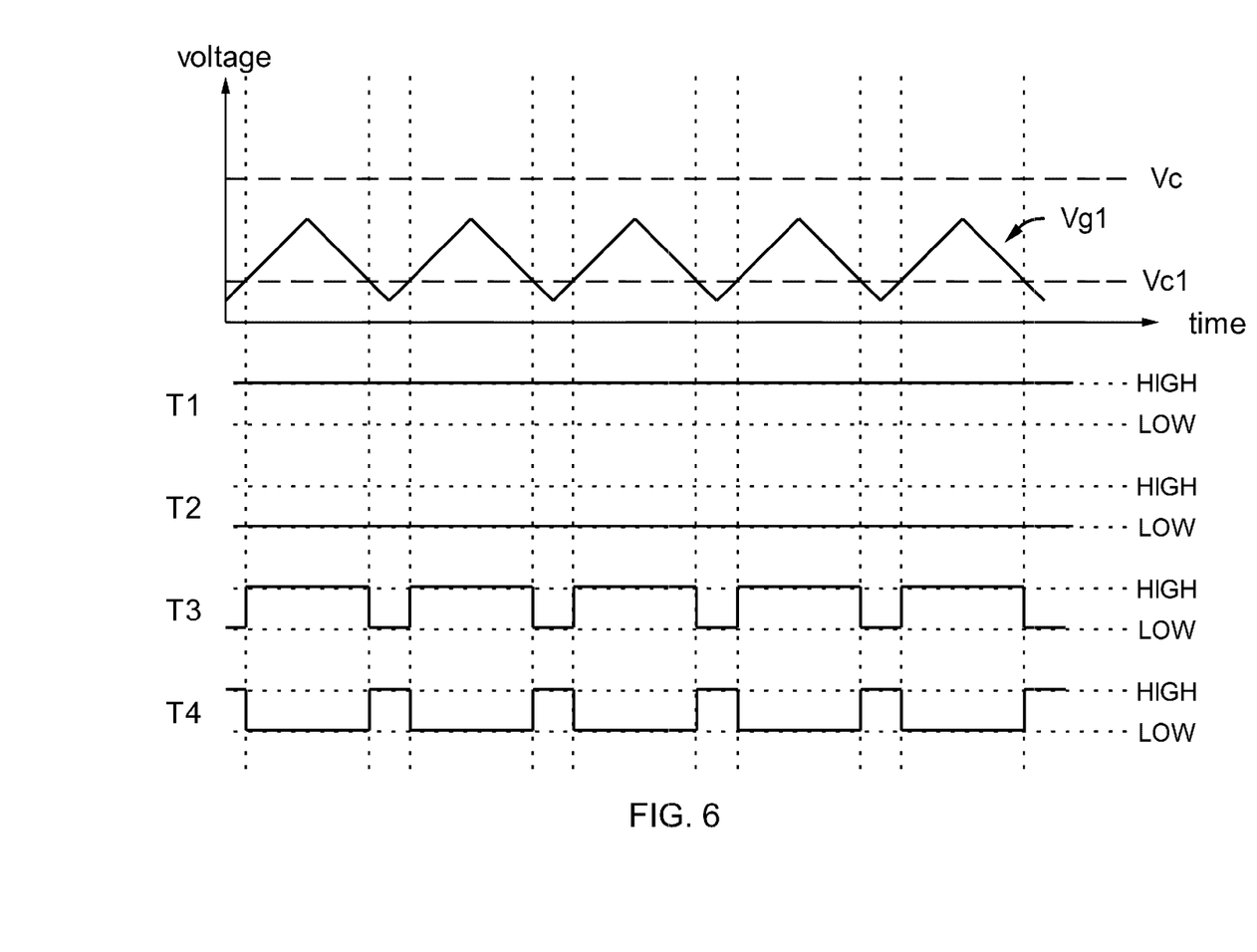

In FIG. 6, the reference signal Vc is always greater than the reference signal Vg1 and the reference signal Vc1 locates between the maximum value and the minimum value of the reference signal Vg1. Moreover, the control signals BB, BB1, and/or BB2 (not shown in the FIG. 6) do not configure the buck-boost converter 100 to operate in the buck-boost mode. In this configuration, the comparator circuit 410 configures the control signal T1 to be high and the control signal T2 to be low, and the comparator circuit 430 generates the periodical control signals T3 and T4. The signal selection circuit 490 selects the control signals T1, T2, T3, and T4 to be the control signals S1, S2, S3, and S4 according to the control signals BB, BB1, and/or BB2 so that the buck-boost converter 100 operates in the boost mode.

Figure 7:
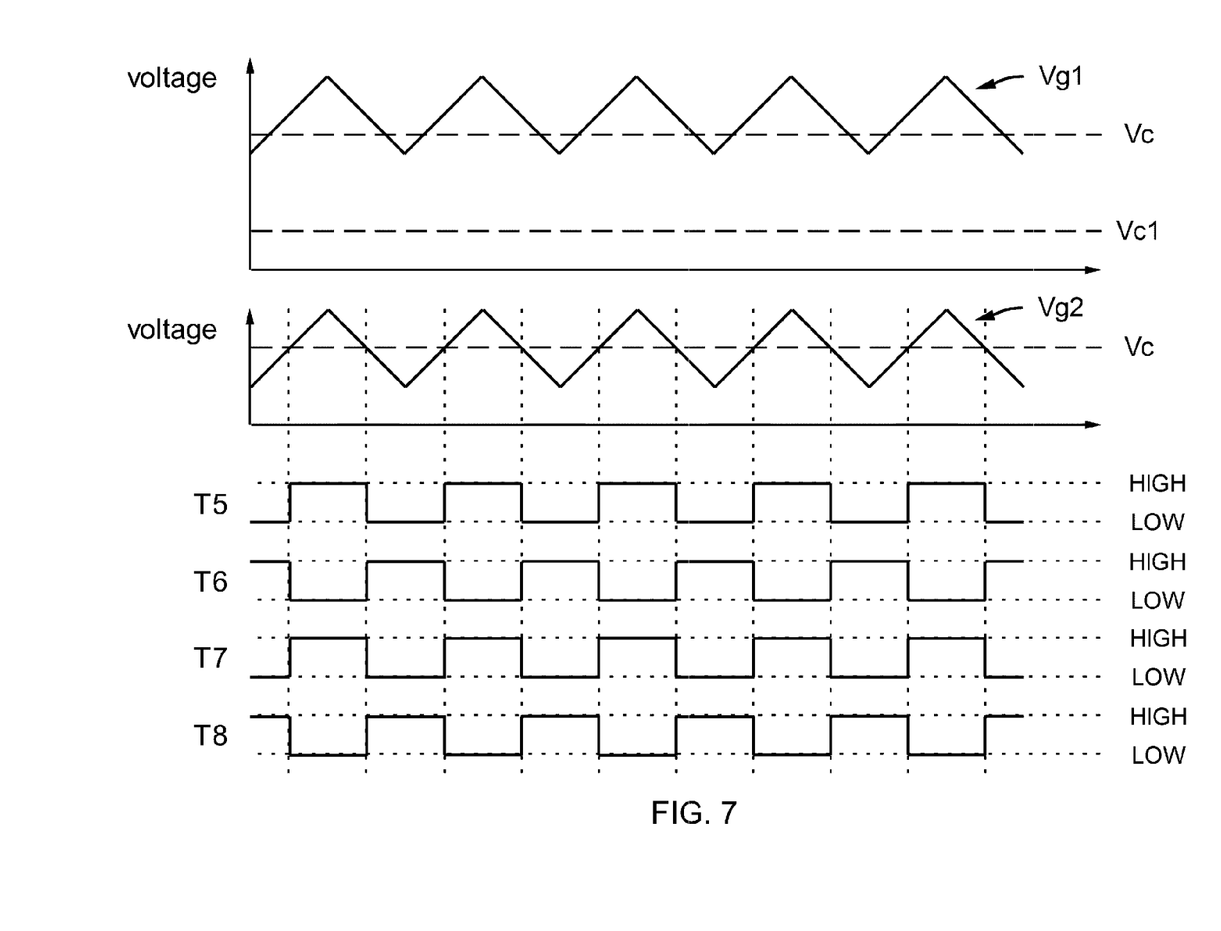

In FIG. 7, the reference signal Vc locates between the maximum value and the minimum value of the reference signal Vg1, and the reference signal Vc1 is always less than the reference signal Vg1. Moreover, the control signals BB, BB1, and/or BB2 configure the buck-boost converter 100 to operate in the buck-boost mode.

Figure 8:
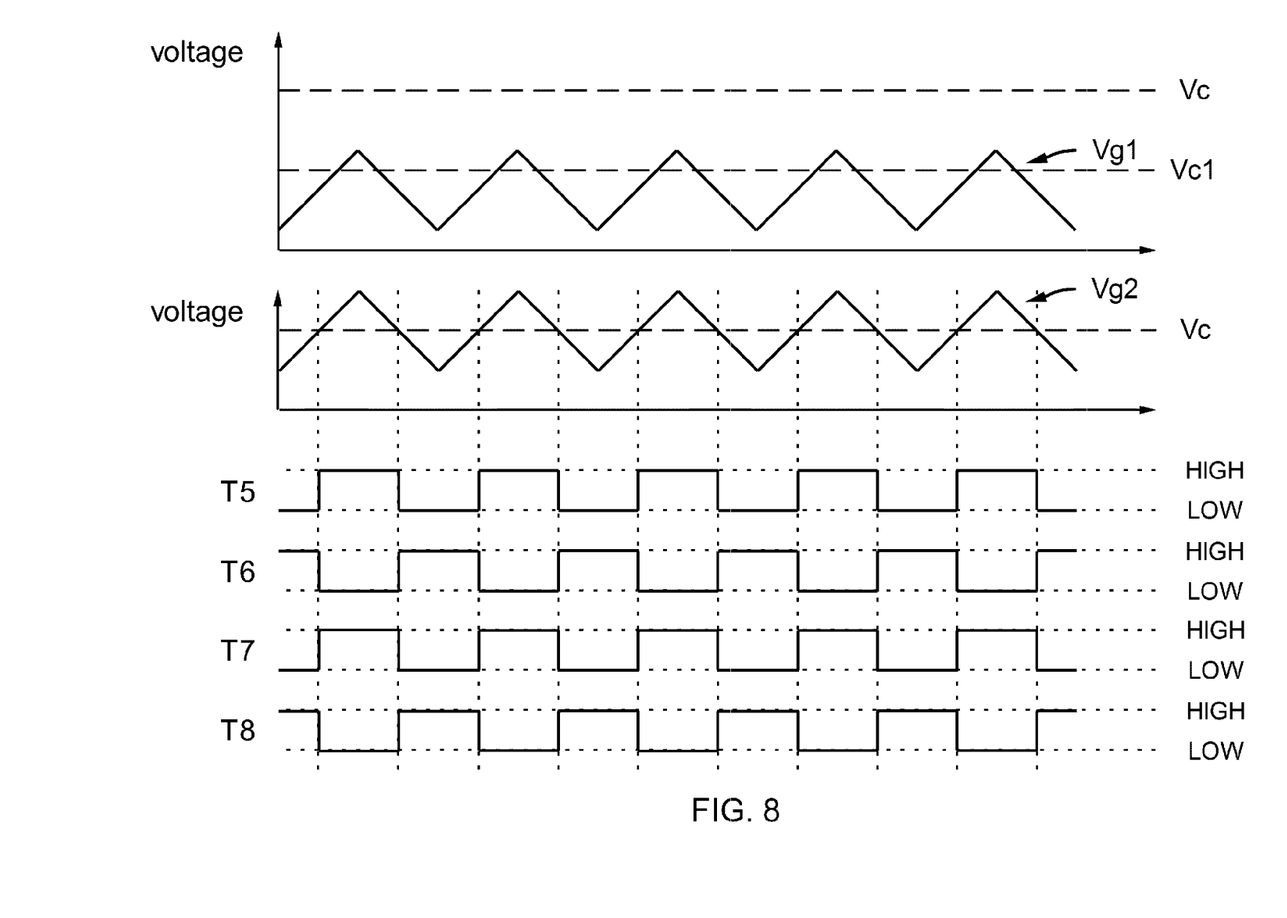

In FIG. 8, the reference signal Vc is always greater than the reference signal Vg1, and the reference signal Vc locates between the maximum value and the minimum value of the reference signal Vg1. Moreover, the control signals BB, BB1, and/or BB2 configure the buck-boost converter 100 to operate in the buck-boost mode.

In FIGS. 7 and 8, the reference signal Vc locates between the maximum value and the minimum value of the reference signal Vg2. The comparator circuit 450 generates the periodical control signals T5, T6, T7, and T8 according to the reference signal Vc and the reference signal Vg2. The duty cycles of the control signals T5 and T7 are configured to be substantially the same, and the duty cycles of the control signals T6 and T8 are configured to be substantially the same. The signal selection circuit 490 selects the control signals T5, T6, T7, and T8 to be the control signals S1, S2, S3, and S4 according to the control signals BB, BB1, and/or BB2 so that the buck-boost converter 100 operates in the buck-boost mode.

In the foregoing embodiments, the reference signals Vc, Vc1, Vg1, and/or Vg2 may be configured, and/or the parameters for generating the control signals BB, BB1, and/or BB2 (e.g., the reference voltages Vrbb1 and Vrbb2) may be configured so that the control signal generating circuit 270 may generates the suitable control signals S1, S2, S3, and S4. Thus, the buck-boost converter 100 may operates in the buck mode, the boost mode, or the buck-boost mode.

In another embodiment, the buck-boost converter 100 may be configured to operate in only two of the boost mode, the buck mode, and the buck-boost mode. The foregoing reference signals and/or the foregoing control signals may also be configured so that the control signal generating circuit 270 may generate the suitable control signals S1, S2, S3, and S4. Therefore, the buck-boost converter 100 may operate in the suitable operation mode.

In another embodiment, the feedback signal processing circuit 210 and the waveform generating circuit 230 may be combined or realized with suitable variations. For example, the output voltage Vout and the periodical signals may be processed for generating a periodical reference signal Vc in the feedback signal processing circuit 210. The reference signals Vg1 and Vg2 may be respectively configured to be the same or different values. The reference signals Vc, Vg1, and V2 and the control signals BB, BB1, BB2 are transmitted to the control signal generating circuit 270 so that the control signal generating circuit 270 may generate the suitable control signals S1, S2, S3, and S4. Therefore, the buck-boost converter 100 may operate in the suitable operation mode.

The control signals S1 and S2 only conduct one of the switches 111 and 112 at the same time, and the control signals S3 and S4 only conduct one of the switches 113 and 114 at the same time. Therefore, in another embodiment, the control device 200 only generates the control signals S1 and S3 (or the control signals S2 and S4) in the foregoing embodiments, or the control device 200 may only provide the control signals S1 and S3 (or the control signals S2 and S4) in the foregoing embodiments to the buck-boost converter 100. The control signal S1 (or S2) is used to configure the switches 111 and 112 with an inverter circuit or other suitable component(s) so that only one of the switches 111 and 112 may be conducted at the same time. The control signal S3 (or S4) is used to configure the switches 113 and 114 with an inverter circuit or other suitable component(s) so that only one of the switches 113 and 114 may be conducted at the same time.

In another embodiment, the duty cycles of the control signals T5 and T7 are substantially the same, and the duty cycles of the control signals T6 and T8 are substantially the same. The comparator circuit 450 generates only one of the control signals T5 and T7 and only one of the control signals T6 and T8 in the foregoing embodiments. The control device 200 may also provide only one of the control signals T5 and T7 and only one of the control signals T6 and T8 in the foregoing embodiments.

In another embodiment, the control device 200 only generates one of the control signals S1 and S2, and generates one of the control signals S3 and S4. The control device 200 may also provide only one of the control signals S1 and S2 and only one of the control signals S3 and S4 to the buck-boost converter 100.

In another embodiment, the feedback signal processing circuit 210, the waveform generating circuit 230, the mode decision circuit 250, and/or the signal selection 490 may be configured at the outside of the control device 200 with suitable modification. Thus, the control signals S1, S2, S3, and S4 may be used to operate the buck-boost converter 100 in the suitable operation mode.

In the foregoing embodiments, when the buck-boost converter 100 operates in the boost mode or the buck mode, the reference signals Vc, Vc1, and Vg1 are used to generate the control signals S1~S4. When the buck-boost converter 100 operates in the buck-boost mode, the reference signals Vc and Vg2 are used to generate the control signals S1~S4. The reference signals Vc, Vc1, Vg1, and Vg2, and/or relevant circuits may be configured appropriately so that the ripple at the output voltage Vout of the buck-boost convert 100 may be reduced when switching from the boost mode to the buck-boost mode or switching from the buck mode to the buck-boost mode.

In the foregoing embodiments, the control device 200 may configure the buck-boost converter 100 to switch between the operation modes by determining whether the difference between the input voltage Vin and the output voltage Vout of the buck-boost converter 100 locates in the predetermined range. The conditions for the buck-boost converter 100 to switch operation modes may be configured by adjusting the predetermined range of the difference. Thus, the control device 200 may provide more design flexibility.

In the foregoing embodiments, the control device 200 may also configure the buck-boost converter 100 to switch between the operation modes according to the duty cycles of the control signals S1, S2, S3, and/or S4. The false switching of operation modes caused by the fluctuation in the input voltage Vin and/or the output voltage Vout of the buck-boost converter 100 may be reduced because the control device 200 does not switch the operation mode only according to the input voltage Vin and/or the output voltage Vout of the buck-boost converter 100. Thus, the ripples at the output voltage Vout of the buck-boost converter 100 may be reduced.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A control device, comprising:
   a first comparator circuit, for generating a first control signal and a second control signal for respectively configuring a first switch and a second switch of a buck-boost converter according to a first periodical signal and according to a first feedback signal generated from an output voltage of the buck-boost converter;
   a second comparator circuit, for generating a third control signal and a fourth control signal for respectively configuring a third switch and a fourth switch of the buck-boost converter according to a second periodical signal and according to a second feedback signal generated from the output voltage of the buck-boost converter; and
   a third comparator circuit, for generating a fifth control signal, a sixth control signal, a seventh control signal, and an eighth control signal for respectively configuring the first switch, the second switch, the third switch, and the fourth switch of the buck-boost converter according to a third periodical signal and according to a third feedback signal generated from the output voltage of the buck-boost converter;
   wherein the first control signal and the second control signal do not conduct the first switch and the second switch at the same time; the third control signal and the fourth control signal do not conduct the third switch and the fourth switch at the same time; the duty cycle of the fifth control signal and the duty cycle of the seventh control signal are substantially the same; the duty cycle of the sixth control signal and the duty cycle of the eighth control signal are substantially the same; the fifth control signal and the sixth control signal do not conduct the first switch and the second switch at the same time; and the seventh control signal and the eighth control signal do not conduct the third switch and the fourth switch at the same time.

2. The control device of claim 1, further comprising:
   a signal selection circuit, for selecting the first, the second, the third, and the fourth control signals or for selecting the fifth, the sixth, the seventh, and the eighth control signals to configure the first, the second, the third, and the fourth switches, respectively.

3. The control device of claim 1, wherein the first, and second, the third, the fourth, the fifth, the sixth, the seventh, and the eighth control signals are transmitted to the buck-boost converter through a signal selection circuit, and the signal selection circuit selects the first, the second, the third, and the fourth control signals or selects the fifth, the sixth, the seventh, and the eighth control signals to configure the first, the second, the third, and the fourth switches.

4. The control device of claim 3, further comprising:
   a first mode decision circuit, for configuring the signal selection circuit to select the fifth, the sixth, the seventh, and the eighth control signals to configure the first, the second, the third, and the fourth switches when the duty cycle of the first control signal is greater than a first predetermined value and the duty cycle of the third control signal is less than a second predetermined value.

5. The control device of claim 4, wherein the first mode decision circuit configures the signal selection circuit to select the first, the second, the third, and the fourth control signals to configure the first, the second, the third, and the fourth switches when the duty cycle of the first control signal is greater than a third predetermined value and the duty cycle of the third control signal is greater than a fourth predetermined value.

6. The control device of claim 4, wherein the first mode decision circuit configures the signal selection circuit to select the first, the second, the third, and the fourth control signals to configure the first, the second, the third, and the fourth switches when the duty cycle of the first control signal is less than a fifth predetermined value and the duty cycle of the third control signal is less than a sixth predetermined value.

7. The control device of claim 3, further comprising:
   a second mode decision circuit, for configuring the signal selection circuit to select the fifth, the sixth, the seventh, and the eighth control signals to configure the first, the second, the third, and the fourth switches when the difference between an input voltage and the output voltage of the buck-boost converter locates in a predetermined range.

8. The control device of claim 1, wherein the first periodical signal and the second period signal are substantially the same, and the first periodical signal and the third periodical signal are not the same.

9. The control device of claim 1, wherein the difference between the first feedback signal and the second feedback signal is greater than the peak-to-peak voltage of the first periodical signal and/or greater than the peak-to-peak voltage of the second periodical signal.

10. The control device of claim 1, wherein the first feedback signal and the second feedback signal are not the same, and the first feedback signal and the third feedback signal are substantially the same.

11. The control device of claim 10, wherein the difference between the first feedback signal and the second feedback signal is greater than the peak-to-peak voltage of the first periodical signal and/or greater than the peak-to-peak voltage of the second periodical signal.

12. A control device comprising:
   a first comparator circuit, for generating a first control signal for configuring a first switch and a second switch of a buck-boost converter according to a first periodical signal and according to a first feedback signal generated from an output voltage of the buck-boost converter;
   a second comparator circuit, for generating a second control signal for configuring a third switch and a fourth switch of the buck-boost converter according to a second periodical signal and according to a second feedback signal generated from the output voltage of the buck-boost converter; and
   a third comparator circuit, for generating a third control signal for configuring the first switch and the second switch and for generating a fourth control signal for configuring the third switch and the fourth switch of the buck-boost converter according to a third periodical signal and according to a third feedback signal generated from the output voltage of the buck-boost converter, wherein the duty cycle of the third control signal and the duty cycle of the fourth control signal are substantially the same or the sum of the duty cycle of the third control signal and the duty cycle of the fourth control signal equals to 1;
   wherein the first control signal does not conduct the first switch and the second switch at the same time; the second control signal does not conduct the third switch and the fourth switch at the same time; the third control signal does not conduct the first switch and the second switch at the same time; and the fourth control signal does not conduct the third switch and the fourth switch at the same time.

13. The control device of claim 12, further comprising:
a signal selection circuit, for selecting the first control signal and the second control signal or for selecting the third control signal and the fourth control signal to configure the first, the second, the third, and the fourth switches.

14. The control device of claim 12, wherein the first, the second, the third, and the fourth control signals are transmitted to the buck-boost converter through a signal selection circuit, and the signal selection circuit selects the first control signal and the second control signal or selects the third control signal and the fourth control signal to configure the first, the second, the third, and the fourth switches.

15. The control device of claim 14, further comprising:
a first mode decision circuit, for configuring the signal selection circuit to select the third control signal and the fourth control signal for configuring the first, the second, the third, and the fourth switches when the duty cycle of the first control signal is greater than a first predetermined value and the duty cycle of the second control signal is less than a second predetermined value.

16. The control device of claim 15, wherein the first mode decision circuit configures the signal selection circuit to select the first control signal and the second control signal for configuring the first, the second, the third, and the fourth switches when the duty cycle of the first control signal is greater than a third predetermined value and the duty cycle of the second control signal is greater than a fourth predetermined value.

17. The control device of claim 15, wherein the first mode decision circuit configures the signal selection circuit to select the first control signal and the second control signal for configuring the first, the second, the third, and the fourth switches when the duty cycle of the first control signal is less than a fifth predetermined value and the duty cycle of the second control signal is less than a sixth predetermined value.

18. The control device of claim 14, further comprising:
a second mode decision circuit, for configuring the signal selection circuit to select the third control signal and the fourth control signal for configuring the first, the second, the third, and the fourth switches when the difference between an input voltage and the output voltage of the buck-boost converter locates in a predetermined range.

19. The control device of claim 12, wherein the first periodical signal and the second period signal are substantially the same, and the first periodical signal and the third periodical signal are not the same.

20. The control device of claim 12, wherein the difference between the first feedback signal and the second feedback signal is greater than the peak-to-peak voltage of the first periodical signal and/or greater than the peak-to-peak voltage of the second periodical signal.

21. The control device of claim 12, wherein the first feedback signal and the second feedback signal are not the same, and the first feedback signal and the third feedback signal are substantially the same.

22. The control device of claim 21, wherein the difference between the first feedback signal and the second feedback signal is greater than the peak-to-peak voltage of the first periodical signal and/or greater than the peak-to-peak voltage of the second periodical signal.

* * * * *